E. W. TIMMIS.
SPRING AND METHOD OF MANUFACTURING THE SAME.
APPLICATION FILED OCT. 25, 1917.

1,266,349.

Patented May 14, 1918.

Inventor
Edgar W. Timmis
by Connolly Bros
Attys

UNITED STATES PATENT OFFICE.

EDGAR WILLIAM TIMMIS, OF LONDON, ENGLAND.

SPRING AND METHOD OF MANUFACTURING THE SAME.

1,266,349.   Specification of Letters Patent.   Patented May 14, 1918.

Application filed October 25, 1917. Serial No. 198,513.

*To all whom it may concern:*

Be it known that I, EDGAR W. TIMMIS, subject of the King of Great Britain, residing at London, S. W., county of Middlesex, England, have invented certain new and useful Improvements in Springs and Methods of Manufacturing the Same, of which the following is a specification, reference being had therein to the accompanying drawing.

My invention has relation to improvements in the manufacture of coiled or spiral springs, and consists in producing a spring from a compound bar, which is composed of a number of individual bars, rods or tubes each of which is axially twisted and the whole then twisted together and welded or rolled to produce a homogeneous whole.

In the accompanying drawing:—

Figure 1:
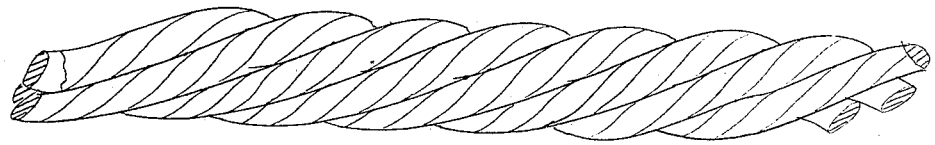
Figure 1 is a perspective view of a bundle of rods to form a compound bar, the individual rods having been twisted axially and all twisted together.
Figure 2:
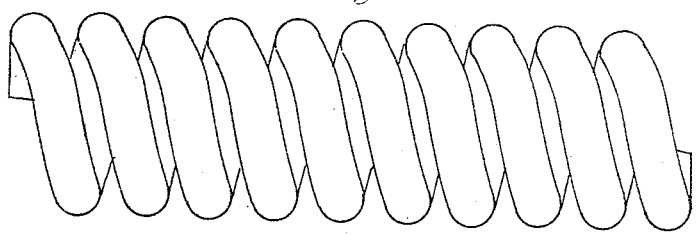
Fig. 2 is a side elevation of a coiled spring produced from the compound bar.

In carrying my invention into effect I take a sufficient number of rods, hollow bars or tubes, of proper diameter, twist each rod, bar or tube axially so as to produce a spiral arrangement of its fibers, then twist the bars, rods or tubes together in the form of a section or length of cable, weld or roll the same into a homogeneous whole and then form therefrom a coiled or helical spring in which the coiled bar is composed of a plurality of axially twisted bars, rods or tubes, twisted and welded together to form a homogeneous whole.

What I claim is:—

1. The method of making a coiled or helical spring consisting in axially twisting a number of bars, rods or tubes to produce a spiral arrangement of their fibers, then twisting said bars, rods or tubes together, welding the parts together into a homogeneous whole and coiling the same into the form of a spring.

2. A coiled spring composed of a compound bar, comprising a number or bundle of axially twisted smaller bars, rods, or tubes, twisted together and welded into a homogeneous whole.

In testimony whereof I have affixed my signature in presence of two witnesses.

EDGAR WILLIAM TIMMIS.

Witnesses:
 ERNEST PASH,
 R. BAGGATT.

Copies of this patent may be obtained for five cents each, by addressing the "Commissioner of Patents, Washington, D. C."